F. E. LEVANSELER.
SUPPORT FOR HINGED COVERS OR MEMBERS.
APPLICATION FILED APR. 17, 1920.
1,370,135.  Patented Mar. 1, 1921.
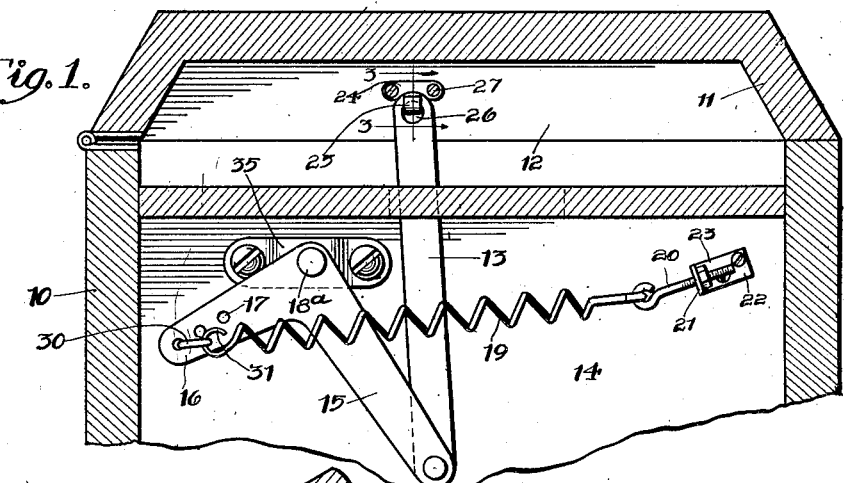
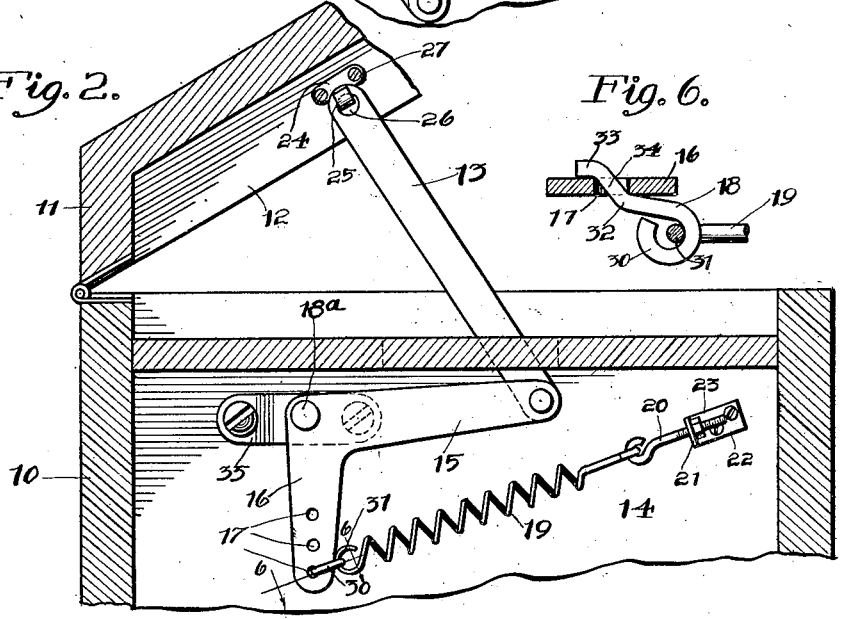
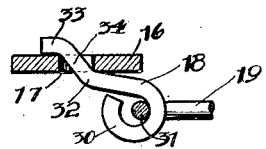
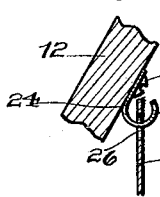
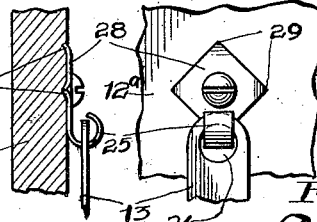
Witness
Geo. L. Lawrence
Inventor
Frank E. Levanseler
By Chas. C. Tillman
Atty.

UNITED STATES PATENT OFFICE.

FRANK E. LEVANSELER, OF CHICAGO, ILLINOIS.

SUPPORT FOR HINGED COVERS OR MEMBERS.

1,370,135. Specification of Letters Patent. Patented Mar. 1, 1921.

Application filed April 17, 1920. Serial No. 374,530.

*To all whom it may concern:*

Be it known that I, FRANK E. LEVANSELER, a citizen of the United States, residing at Chicago, in the county of Cook and State of Illinois, have invented certain new and useful Improvements in Supports for Hinged Covers or Members, of which the following is a specification.

This invention relates to certain new and useful improvements in a type of support of the character disclosed in Letters Patent No. 1,336,085, issued to me on the 6th day of April, 1920, for improvements in a support for hinged covers or members, and has for its objects similar ones to that set forth in my aforesaid Letters Patent, to wit: to provide a simple and inexpensive support for the hinged lids of phonographs, graphophones, disks, trunks, boxes, pianos and the like, when raised or turned on their hinges to any desired elevation or angle, in such a manner that the supporting action or operation of the device will be automatic, and of such a character as to securely hold the lid, cover or member in its tilted or raised position against accidental lowering or falling of the same, yet, so that, by the proper manipulation of the cover or member, and by applying slight downward pressure thereto, it can be easily lowered or closed, in which position it will remain until again lifted.

The principal object of my present invention is to provide improved means for connecting one end of the link of the supporting mechanism to the lid or hinged member and furthermore, to provide improved means for connecting one end of the spring which actuates a bell crank lever and said link of the mechanism in such a manner that the arms of said lever will not interfere in their movements with said spring; in other words, so that the arms of said lever will move in the same vertical plane at one side of the plane in which the actuating spring is located.

Other objects and advantages of the invention will be disclosed in the subjoined description and explanation.

In the accompanying drawing which serves to illustrate an embodiment of the invention—

Figure 1 is a vertical sectional view through a portion of a box or casing with its lid closed showing the support in position ready for use.

Fig. 2 is similar view of like parts showing the cover or lid raised or tilted and illustrating the position the parts of the support will assume.

Fig. 3 is a fragmental sectional view of the side wall of the lid to which the link of the device is connected at one of its ends, said view being taken on line 3—3 of Fig. 1 looking in the direction indicated by the arrows.

Fig. 4 is a similar view of like parts showing a modification in the construction of the wall of the lid and also in the means for connecting the link to said wall.

Fig. 5 is a fragmental face view of the construction shown in Fig. 4, and

Fig. 6 is an enlarged view partly in section and partly in elevation of one arm of the bell crank lever and the device employed for connecting one end of the actuating spring thereto, the view being taken on line 6—6 of Fig. 2.

Like numerals of reference refer to corresponding parts throughout the different views of the drawing.

The reference numeral 10 designates a portion of the box or casing such as that of a phonograph, which may be of the ordinary or any preferred construction and has hinged to the upper portion of one of its walls a cover 11 which in the present instance is shown with a depending flange 12 at its perimeter, but which if desired, may be omitted.

Pivotally connected at one of its ends to the cover 11 at a suitable distance from its hinged portion, is a link 13 which is extended down along the inner surface of one end or wall 14 of the box or casing and is pivotally connected at its lower end to one end of a longer arm 15 of a bell-cranklever which is fulcrumed to the box or casing near its upper portion. The shorter arm 16 of said lever is provided with a series of openings 17 arranged in a row or line with the axis of the fulcrum 18$^a$ of said lever. Connected to the shorter arm 16 of the lever by means of a novel and improved connecting member 18 is one end of a spiral spring 19 the other end of which is connected to one end of an adjustable rod 20 which is shown as extending through a suitable opening in an inwardly extended flange 21 on a bracket 22 which is secured to the wall 14 of the casing near the wall opposite that wall to which the cover is hinged. The rod 20 is screw-threaded and has mounted on the threaded portion a nut 23, by means of which said rod may be retained in the desired position and adjusted so as to nicely regulate the tension of the spring 19 when desired.

In Figs. 1 and 3 of the drawing the flange 12 of the lid or cover is shown as being downwardly and outwardly beveled on its inner surface and to provide means for securely and appropriately connecting the link 13 to said flange or lid, I employ a plate 24 which is provided on its lower portion with an inwardly and upwardly turned hook 25 to fit in an opening 26 in the upper portion of the link 13. By the use of this flat plate 24 having the inwardly and upwardly extended hook 25 it is obvious that it can be readily and effectively secured to the inner surface of the flange or wall 12 of the lid or cover, no matter what the inclination or bevel thereof may be. The plate 24 is by preference secured to the flange 12 by means of screws 27 and it will be understood that as the hook 25 of said plate is extended inwardly and upwardly through the opening 26 of the link, that the upper end of the latter will be located adjacent the inner surface of the plate, to the end, that when lids 11 having inclined flanges 12 as shown in Figs. 1 and 3 are employed, the thrusts of the upper end of the link 13 will be made against the metal plate 24 instead of against the wooden flange of the lid thus preventing the same being marred or injured.

It is obvious that the link 13 will have lateral movement on the hook 25 so as to permit of such movement of the link in the operation of opening and closing the lid without undue friction. Instead of employing a flat securing plate 24 as shown in Figs. 1 and 3 of the drawings as above described, I may use a plate of the modified construction shown in Figs. 4 and 5 which consists of a rectangular plate 28 having a plurality of its corners outwardly deflected as at 29 to engage the flange 12ª of the lid as will be readily understood by reference to Figs. 4 and 5 of the drawing. This modified construction of the securing plate is provided as in the other construction with an inwardly and upwardly extended hook 25 for engagement with an opening 26 in the link 13.

The operation of the link and the modified form of securing plate therefor is the same as in the other construction above described. The improved means for connecting one end of the spring 19 to the shorter arm 16 of the bell-crank-lever comprises a connecting member 18 which is by preference made of wire and has at one of its ends a hook 30 into which a hook 31 on the spring 19 may be linked as is clearly shown in Figs. 1, 2 and 6 of the drawings. The body or shank of the member 18 is provided with a pair of opposed bends 32 and 33 which results in an inclined portion 34 at a pitch sufficient to allow the said inclined portion to extend through one of the openings 17 in the shorter arm of the lever in such a way that the adjacent surfaces of the bent portions 32 and 33 will rest on or form bearings for the inner and outer surfaces respectively of the arm 16 at the ends or edges of the opening 17 thereof in which the angularly disposed portion 34 of the member 18 is located. Thus it will be seen and understood that the member 18 will have swivel movement in the opening 17 and that by its use the actuating spring 19 will be disposed in a different plane from that in which the arms 15 and 16 of the bell-crank-lever are located and adapted to operate. In order to provide for quick or coarse adjustment of the tension of the spring 19 the openings 17 in the arm 16 of the lever are provided from one of which openings to another the connecting member 18 can be readily changed.

From the foregoing and by reference to the drawing, it will be seen and understood that by raising the lid or cover 11 from the position shown in Fig. 1 to that shown in Fig. 2 of the drawing, the link 13 and bell crank lever will be moved upwardly so that the arm 16 of said lever will be under the tension of the spring 19, thus holding the cover at the desired inclination or elevation until it is desired to lower the same, when, by a very slight downward pressure on the lid, the same will be lowered gradually until it rests on the top of the box or casing in which position it will remain until again lifted.

In order to hold the bell-crank-lever at a suitable distance from the wall of the casing to which it is secured, I may employ a block or plate 35 having a portion between its ends enlarged or bent outwardly from the wall to which it may be secured by screws or otherwise.

Having thus fully described my invention, what I claim as new and desire to secure by Letters Patent is—

1. The combination with a hinged cover or member, of a plate secured to the cover or member and having an inwardly lateral and upwardly curved hook extended therefrom, the end of said hook being disposed adjacent the surface of the plate opposite the said member, a link loosely connected near one of its ends to said hook, and a suitably fulcrumed spring-actuated bell-crank-lever pivotally connected at one of its ends to the other end of said link.

2. The combination with a hinged cover or member, of a link loosely connected at one of its ends thereto at a suitable distance from the hinged portion thereof, a suitably fulcrumed bell-crank-lever pivotally connected at one of its ends to said link and having at a point near the end thereof opposite the link at least one opening, a spring connected at one of its ends to a suitable support and having a hook at its other end, and a connecting member consisting of a shank having at one of its ends a hook engaging the hook of said spring and provided in its shank with opposed bends whereby an inclined portion between said bends is produced, said inclined portion of said member being located in an opening of the bell-crank-lever.

3. A device of the character described including in combination, a hinged cover or member, a plate secured to the cover or member and having an inwardly lateral and upwardly curved hook extended therefrom, the end of said hook being disposed adjacent the surface of the plate opposite the said member, and a link loosely connected at one of its ends to said hook.

4. A device of the character described including in combination, a suitably fulcrumed bell-crank-lever having in one of its arms at least one opening, a spring connected at one of its ends to a suitable support and having a hook at its other end, and a connecting member consisting of a shank having at one of its ends a hook engaging the hook of said spring and provided in its shank with opposed bends whereby an inclined portion between said bends is produced, said inclined portion of said member being located in an opening of the bell-crank-lever, the opposed extensions of said bends in contact with the opposed surfaces of said lever diametrically of said opening.

5. The combination with a hinged cover or member, of a plate secured to the cover or member at a suitable distance from the hinged portion thereof, said plate having an inwardly lateral and upwardly curved hook extended from its lower portion, a link loosely connected near one of its ends to said hook, a suitably fulcrumed bell-crank-lever pivotally connected at one of its ends to said lever and having at a point near the end thereof opposite its connection with the link at least one opening, a spring connected at one of its ends to a suitable support and having a hook at its other end, and a connecting member consisting of a shank having at one of its ends a hook engaging the hook of said spring and provided in its shank with opposed bends whereby an inclined portion between said bends is produced, said inclined portion of said member being located in an opening of the bell-crank-lever.

FRANK E. LEVANSELER.